United States Patent
Raffaelli

(10) Patent No.: US 11,117,636 B2
(45) Date of Patent: Sep. 14, 2021

(54) TILTING MOTORCYCLE WITH THREE WHEELS AND A RIGID REAR AXLE

(71) Applicant: PIAGGIO & C. S.p.A., Pisa (IT)

(72) Inventor: Andrea Raffaelli, Pisa (IT)

(73) Assignee: PIAGGIO & C. S.P.A., Pontedera (IT)

(*) Notice: Subject to any disclaimer, the term of this patent is extended or adjusted under 35 U.S.C. 154(b) by 0 days.

(21) Appl. No.: 16/769,640

(22) PCT Filed: Dec. 17, 2018

(86) PCT No.: PCT/IB2018/060179
§ 371 (c)(1),
(2) Date: Jun. 4, 2020

(87) PCT Pub. No.: WO2019/123205
PCT Pub. Date: Jun. 27, 2019

(65) Prior Publication Data
US 2021/0039738 A1    Feb. 11, 2021

(30) Foreign Application Priority Data
Dec. 22, 2017   (IT) .................... 102017000149321

(51) Int. Cl.
*B62K 5/00*     (2013.01)
*B62K 5/027*    (2013.01)
*B62K 5/06*     (2006.01)

(52) U.S. Cl.
CPC ............... *B62K 5/027* (2013.01); *B62K 5/06* (2013.01); *B60G 2300/122* (2013.01); *B60G 2300/45* (2013.01); *B62K 2005/001* (2013.01)

(58) Field of Classification Search
CPC .......... B60G 2300/45; B60G 2300/122; B62K 5/06; B62K 5/10; B62K 2005/001; B62K 5/027
See application file for complete search history.

(56) References Cited

U.S. PATENT DOCUMENTS 2,819,093 A * 1/1958 Geiser .................... B62D 61/08
                                                    280/282
3,504,934 A * 4/1970 Wallis ..................... B62K 5/02
                                                    280/282
(Continued)

FOREIGN PATENT DOCUMENTS

CN     204846254 U     12/2015
JP     2004131027 A     4/2004
(Continued)

OTHER PUBLICATIONS

International Search Report for corresponding application PCT/IB2018/060179 filed Dec. 17, 2018; dated Mar. 18, 2019.
(Continued)

*Primary Examiner* — Paul N Dickson
*Assistant Examiner* — Maxwell L Meshaka
(74) *Attorney, Agent, or Firm* — Cantor Colburn LLP

(57) ABSTRACT

A tilting motor cycle with at least three wheels including: a frame, at least one front wheel, a rear end comprising an engine group and a couple of rear wheels, where the rear end is hinged to the frame in order to allow a rolling of the frame around a rolling axis and a pitching of the rear end around a pitching axis, where the rear end is further connected to the frame by means of a suspension system including: a couple of uprights connected at the bottom by means of two first hinges to the engine group, at least one first crosspiece hinged at the distal ends thereof to the uprights, the center of the first crosspiece being connected to the frame directly or indirectly by means of a transmission element, the uprights or the transmission element including a suspension to dampen the rear end with respect to the frame.

14 Claims, 7 Drawing Sheets

(56) References Cited

U.S. PATENT DOCUMENTS

| | | | | |
|---|---|---|---|---|
| 3,583,727 | A | * | 6/1971 | Wallis .................... B62D 61/08 280/283 |
| 3,605,929 | A | * | 9/1971 | Rolland ................. B62D 61/08 180/208 |
| 3,698,502 | A | * | 10/1972 | Patin ........................ B62K 5/10 180/215 |
| 3,931,989 | A | * | 1/1976 | Nagamitsu ............... B62K 5/02 280/283 |
| 4,437,535 | A | * | 3/1984 | Winchell ............... B62K 5/027 180/210 |
| D480,665 | S | * | 10/2003 | Gunter ......................... D12/112 |
| 7,309,081 | B1 | * | 12/2007 | Zuhlsdorf ................ B62K 5/01 280/6.154 |
| D642,096 | S | * | 7/2011 | Taylor .......................... D12/112 |
| 9,327,725 | B2 | * | 5/2016 | Anderfaas ............. B60W 10/04 |
| 2008/0001377 | A1 | * | 1/2008 | Rogic ..................... B60G 7/02 280/124.125 |
| 2011/0275256 | A1 | * | 11/2011 | Gibbs .................... B60F 3/003 440/12.51 |
| 2015/0137481 | A1 | * | 5/2015 | Manternach ........... B62K 5/007 280/400 |
| 2020/0102037 | A1 | * | 4/2020 | Hirayama ................ B62D 9/02 |

FOREIGN PATENT DOCUMENTS

| | | |
|---|---|---|
| WO | 2006002590 A1 | 7/2004 |
| WO | 2005095195 A1 | 10/2005 |

OTHER PUBLICATIONS

Written Opinion of the International Searching Authority for corresponding application PCT/IB2018/060179 filed Dec. 17, 2018; dated Mar. 18, 2019.

Chinese Office Action for corresponding application 2018800828282 dated Apr. 1, 2021.

* cited by examiner

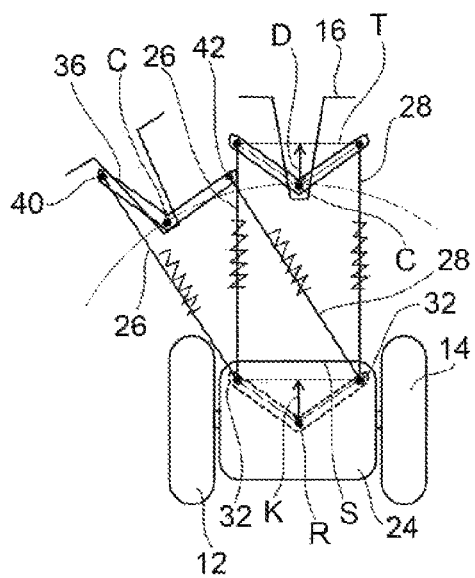

TILTING MOTORCYCLE WITH THREE WHEELS AND A RIGID REAR AXLE

TECHNICAL FIELD

The present disclosure relates to a tilting motor cycle with at least three wheels and a rigid rear axle.

BACKGROUND

Tilting motor cycles are known with at least three wheels and a rigid rear axle, designed to carry loads placed at the rear end of the frame.

In particular, such vehicles comprise a rear end having an engine group and a rigid axle provided with a couple of rear wheels; the rear end is hinged to the frame in order to allow a rolling of the frame about a rolling axis and a pitching of the rear end about a pitching axis; the rear end is further connected to the frame by means of a suspension system.

The main connection between the rear end and the frame is carried out by means of the interposition of a joint, which allows both the rolling and the pitching between the frame and the rear end.

From a structural point of view, in this type of vehicles, it is attempted to limit the passage of loads through the joint to a maximum, hence the positioning of the suspension on the vertical of the axis of the rear wheels.

However, in this way, by connecting the engine to the frame by a damper during the rolling, instead of following a circular trajectory around the rolling axis, the upper fixing thereof tends to follow a smaller arc of a circle with the center in the lower fixing thereof.

This condition is shown, for example, in FIG. 1, wherein the circular trajectory around the rolling axis is indicated with reference 2, while the effective trajectory with the center in the lower fixing is indicated with reference 3.

Since the damper cannot extend, if the load, which compresses it does not decrease (and indeed increases on the bend), the rear part of the vehicle will tend to lower, thus increasing the incidence and the front wheel trail of the front end of the motor cycle.

Such increases can be measured geometrically and have the effect of making the drive heavier and the vehicle less reactive to the rotation of the handlebars.

Thus, the need is felt to overcome the drawbacks and limitations stated with reference to the prior art.

Such need is satisfied by a tilting motor cycle as described herein.

BRIEF DESCRIPTION OF THE DRAWINGS

Further features and advantages of the present disclosure will become clearer from the description below of preferred, non-limiting embodiments thereof, wherein:

FIG. 4 represents a schematic side view of a tilting motor cycle according to one embodiment of the present disclosure;

FIGS. 5a, 5b, 5c represent constructional diagrams of possible embodiments of the present disclosure;

Figure 1:
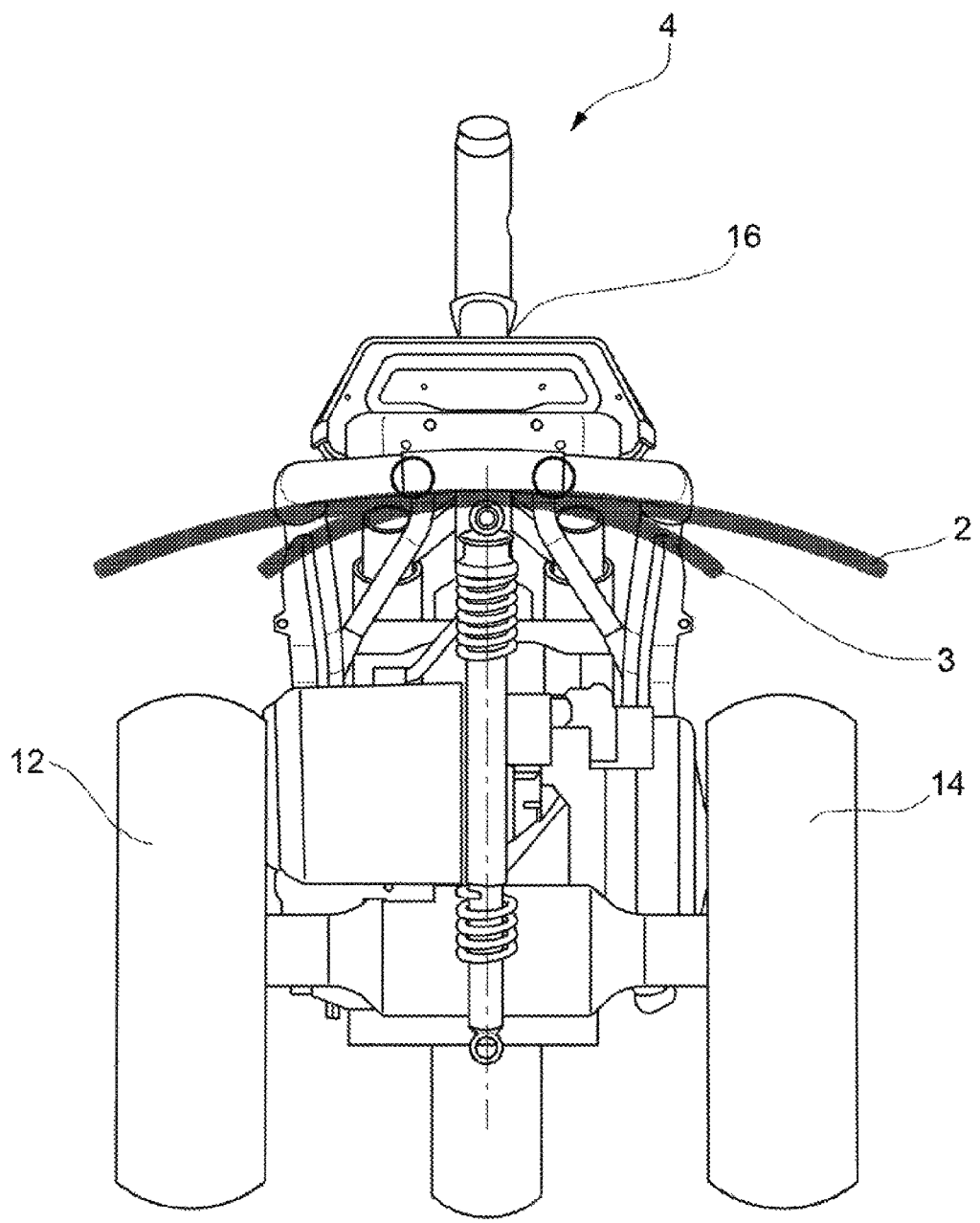
FIG. 1 represents a schematic view of a tilting motor cycle of the prior art.
Figure 2:
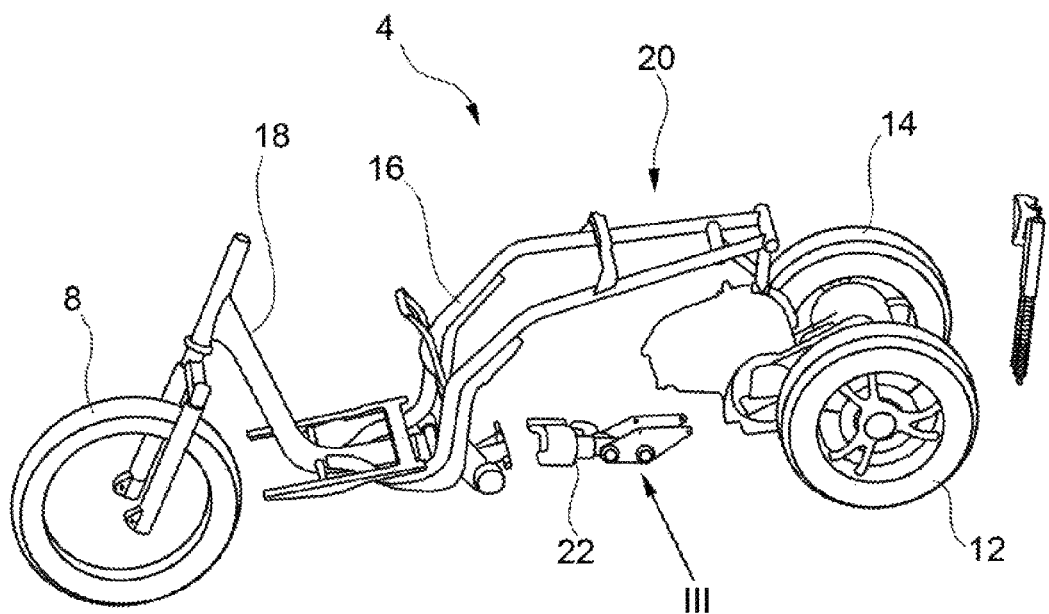
FIG. 2 represents a perspective view of a tilting motor cycle according to one embodiment of the present disclosure.

Elements or parts of elements in common between the embodiments described below will be indicated with the same numerical references.

DETAILED DESCRIPTION

With reference to the aforesaid figures, an overall schematic view of a tilting motor cycle according to the present disclosure is globally indicated with reference 4.

The tilting motor cycle 4 comprises at least three wheels, including at least one front wheel 8 and two rear wheels 12, 14.

The motor cycle 4 further comprises a frame 16, comprising a front end 18 and a rear end 20. The rear end 20 comprises an engine group 24 and said couple of rear wheels 12, 14.

The rear end 20 is typically a rear end with a rigid rear axle.

The rear end 20 is hinged to the frame 16 in order to allow a rolling of the frame 16 about a rolling axis R-R and a pitching of the rear end 20 about a pitching axis B-B.

Figure 3:
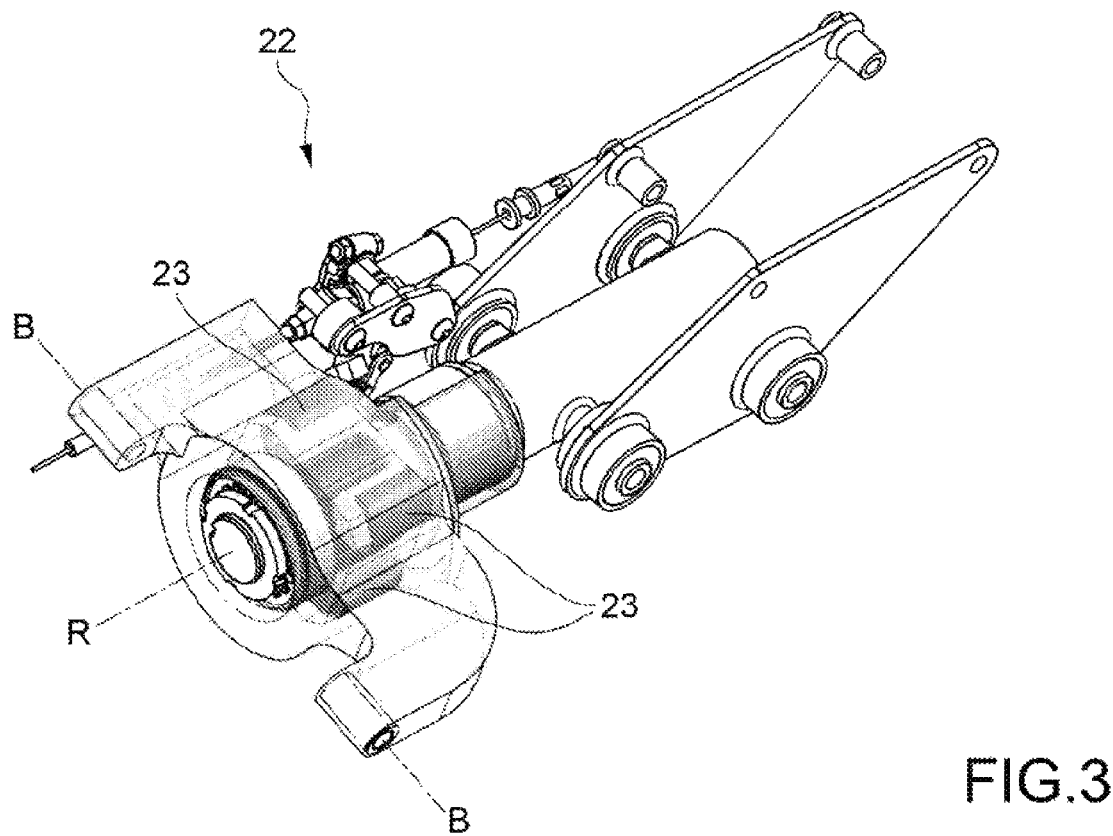
FIG. 3 represents a detailed perspective view of the enlarged detail III in FIG. 2.

For example, as shown better in FIG. 3, the tilting motor cycle 4 comprises an articulated joint 22 arranged between the frame 16 and the rear end 20 to cause said rolling and pitching of the frame 16.

According to a possible embodiment, the articulated joint 22 comprises a Neidhart joint (FIG. 3).

Such Neidhart joint rotatably connects the two axes to each other, in this case integral with the frame 16 and the engine group 24 respectively, to allow not only a relative rotation but also slight misalignments between the axes themselves. These misalignments can be obtained by the elastic deformation of rollers (cylindrical or conical) made of elastic material, typically of rubber, which act as elastically yielding bearings.

The rear end 20 is further connected to the frame 16 by means of a suspension system, shown in different configurations in FIGS. 5a, 5b e 5c, which comprise a couple of uprights 26, 28 connected at the bottom by means of two first hinges 32, to the engine group 24, at least one first crosspiece 36 hinged, at the distal ends 40, 42 thereof, to the uprights 26, 28.

In particular, the uprights 26,28 are arranged between opposite sides and the first crosspiece 36 extends between said pair of opposing uprights 26,28. The crosspiece 36 is rotatably connected at the distal ends 40, 42 to the uprights 26, 28

The center C of the first crosspiece 36 is connected to the frame 16 directly or indirectly by means of a transmission element 44.

The uprights 26, 28 or the transmission element 44 comprise a suspension 48 to dampen the rear end 20 with respect to the frame 16.

The suspension 48 comprises at least one spring and/or a damper yielding according to a longitudinal axis L-L of the suspension 48.

The type of spring and/or damper is irrelevant for the purposes of the present disclosure.

According to one embodiment, the first crosspiece 36 is shaped as a triangle so that the center C and the distal ends 40, 42 of the first crosspiece 36 are arranged in a triangle, and the apex of the triangle coincides with the center C of the first crosspiece 36 and is situated at a predetermined distance D from the baseline T, which joins the distal ends 40, 42.

The distance K between said rolling axis R-R and a line S, which joins said two first hinges 32 substantially coincides with said predetermined distance D.

Due to this correspondence between the distances D and K an overall neutral rolling suspension is obtained, wherein the kinematic variation in the rolling angle does not require a variation in the length of the suspension, which can be seen schematically in FIG. 5a.

In fact, from a geometric point of view, the correspondence between the distances D and K means that the kinematic rotation of the suspension is perfectly centered in the rolling axis; in this way, the simple rolling movement of the frame 16 neither involves nor requires a lengthening or shortening of the suspensions 48. Consequently, the simple rolling movement does not cause a lifting or a lowering of the vehicle at the rear end and nor does it require any geometrical variation in the angle of incidence and the front end.

In other words, due to the described kinematic mechanism, the suspension 48 is allowed to work as though it were fixed on a through point for the rolling axis (FIG. 4) with all of the advantages described above.

Furthermore, the use of an articulated quadrilateral allows the load transfers to be balanced and consequently, the compressions and extensions of the suspensions of the uprights, which maintain the same length both in static conditions and dynamic conditions.

FIG. 5a schematically illustrates the kinematic behavior of the articulated quadrilateral. In particular, the first lower hinges 32 stay still because they are associated with an engine group 24 with a rigid axle. A virtual crosspiece is sketched at the bottom of the figure whose center line advantageously passes through the rolling axis R-R. In the event of rolling, the virtual lower crosspiece stays still, while the first crosspiece 36 rotates (i.e. rolls) parallel to the virtual crosspiece, which remains still due to the mechanical connection given by the uprights 26, 28. In fact, the articulated quadrilateral allows the upper crosspiece, i.e. the first crosspiece 36, to rotate, always keeping the parallelism with the lower 'virtual' crosspiece.

Preferably, the first hinges 32, the uprights 26,28, the center C of the first crosspiece 36 and the distal ends 40,42 of said first crosspiece 36 lie on a common suspension plane.

According to one embodiment, said common suspension plane is perpendicular to the rolling axis R-R. This condition facilitates the rolling movement of the frame and allows smaller misalignments between the movable elements and consequently, reduced friction during the compression of the suspensions and the rotations of the uprights 26, 28.

There are also advantages in terms of overall size. In fact, the two suspensions incorporated in the uprights 26, 28 tilt by the same angle as the single suspension, but they remain displaced towards the center line; in the case of a narrow motor cycle lane this difference can be decisive.

Figure 6:
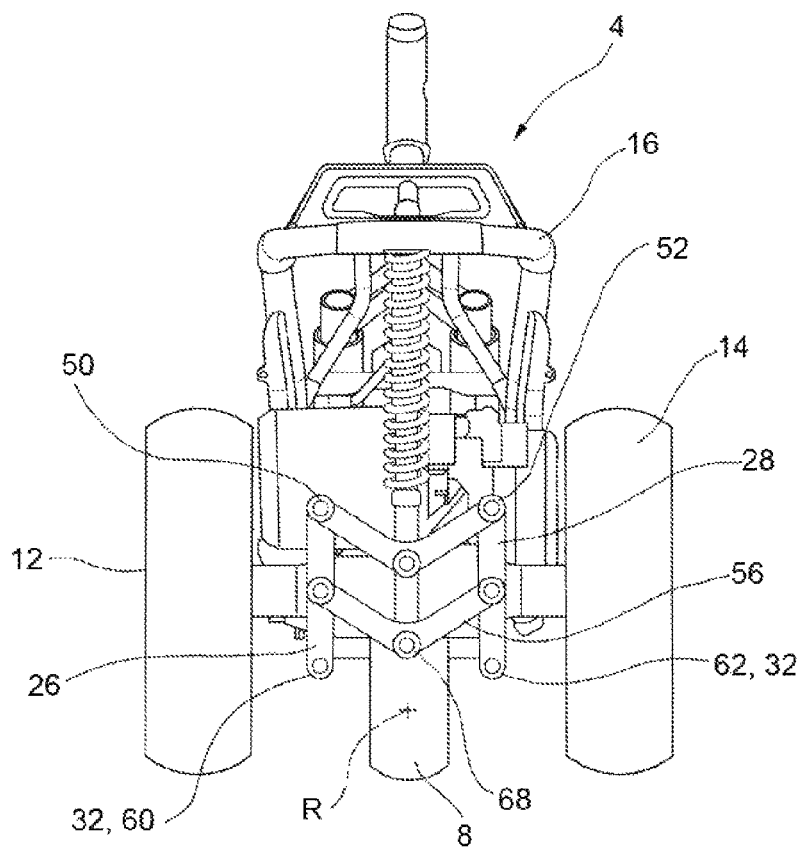
FIGS. 6-7 represent views of a possible embodiment of a motor cycle according to the present disclosure.
Figure 7:
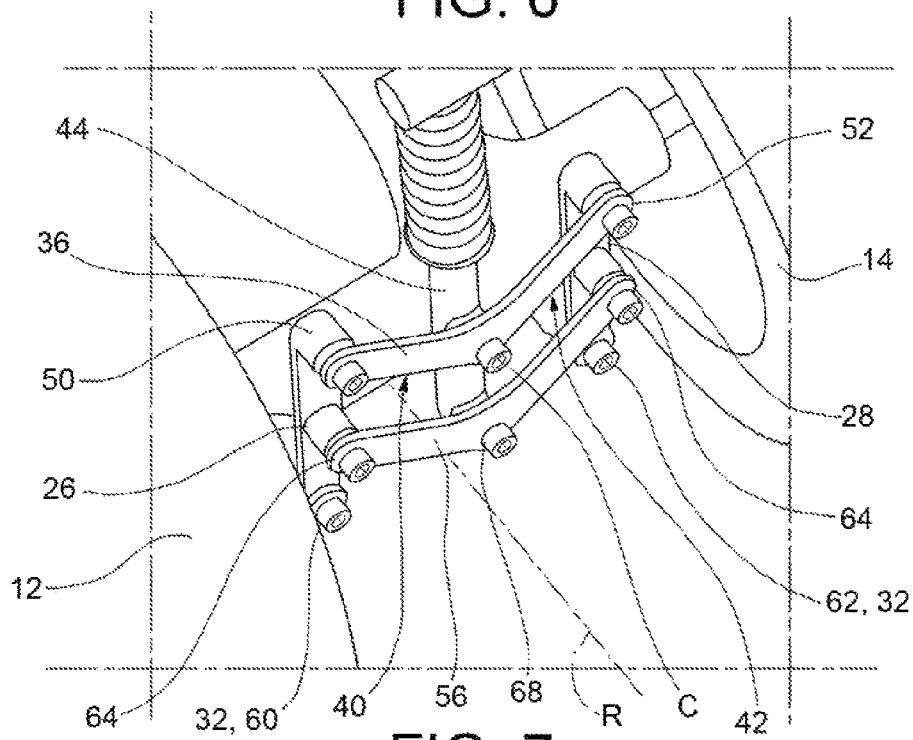
Figure 8:
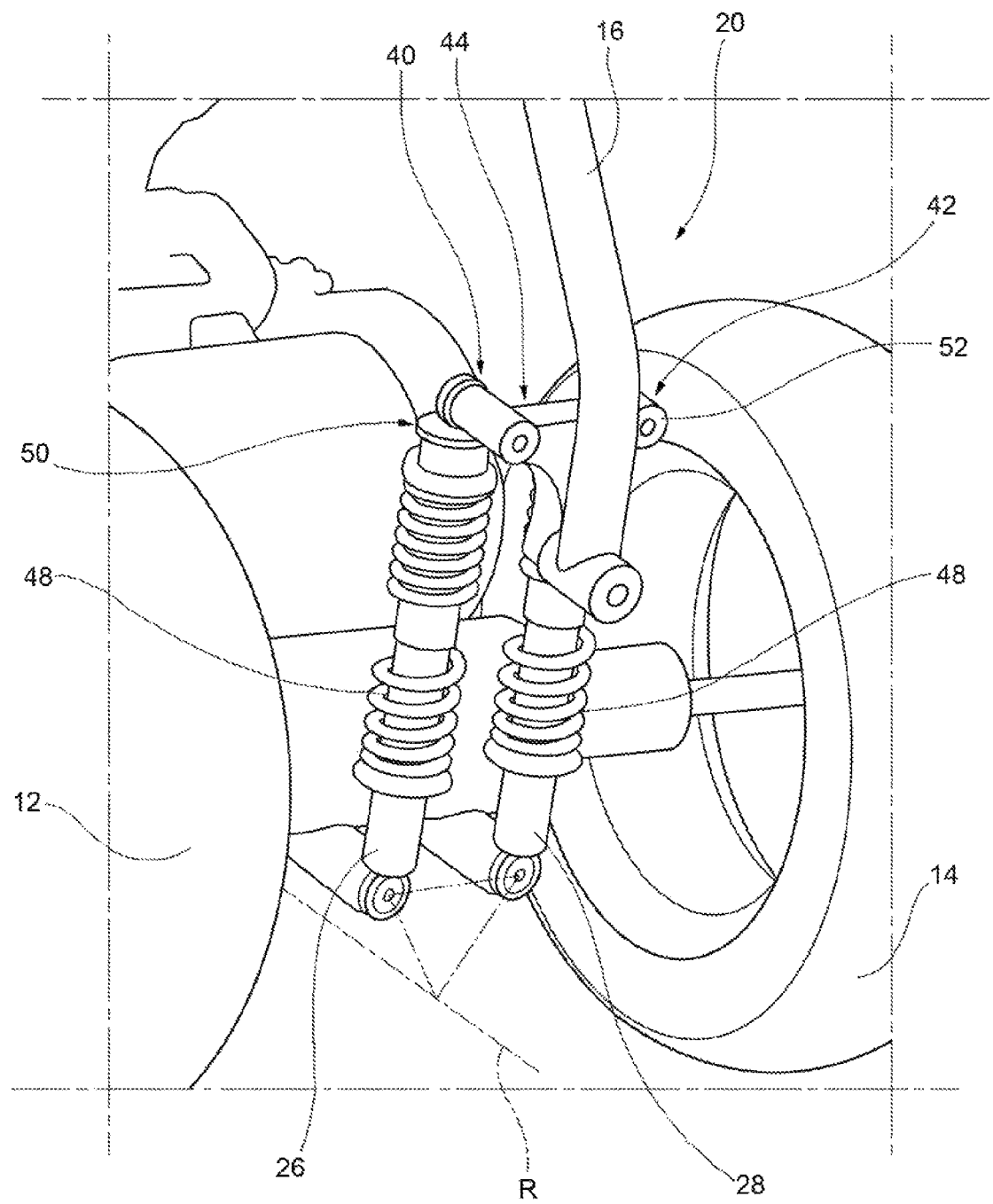
FIGS. 8-9 represent views of a further possible embodiment of a motor cycle according to the present disclosure.
Figure 9:
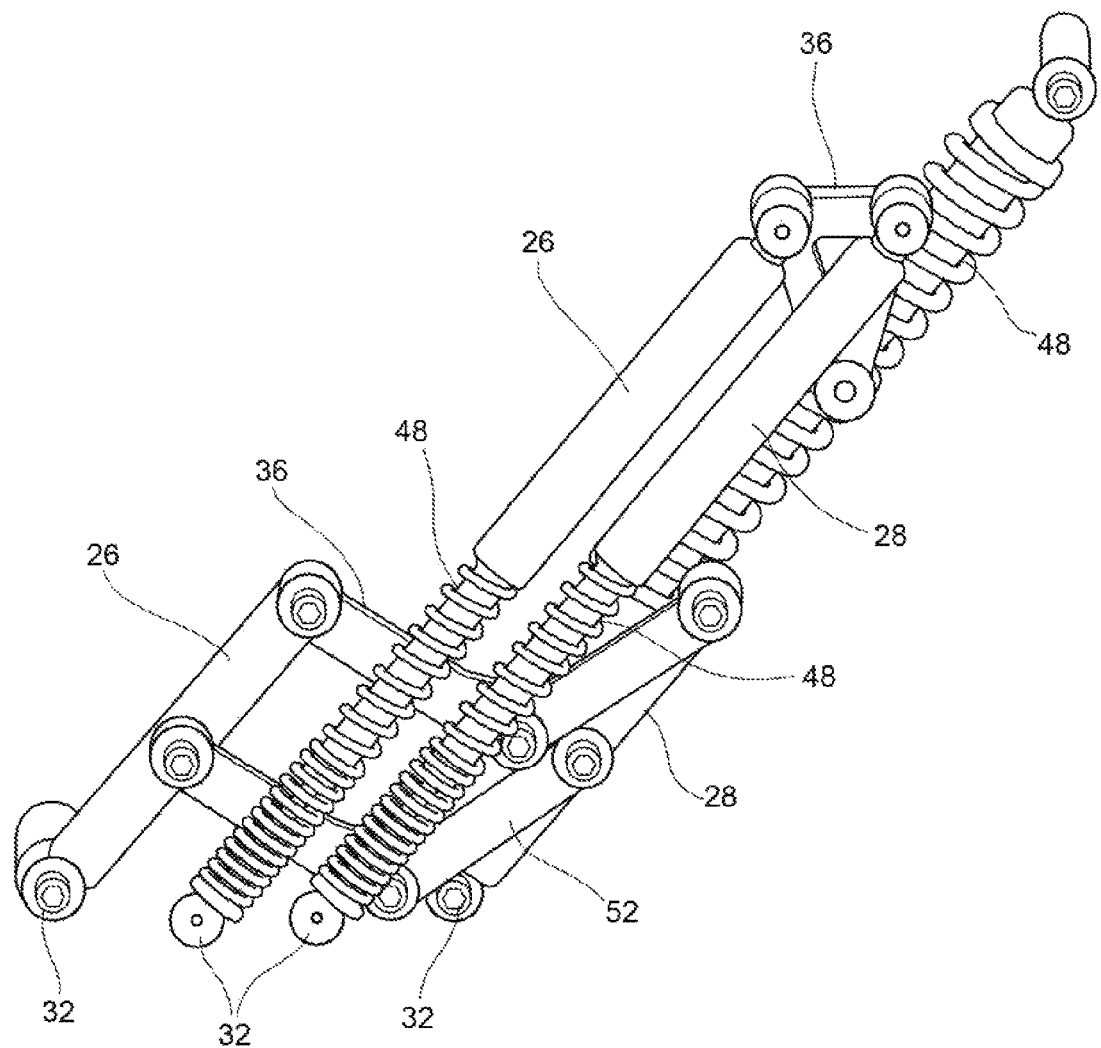
Figure 10:
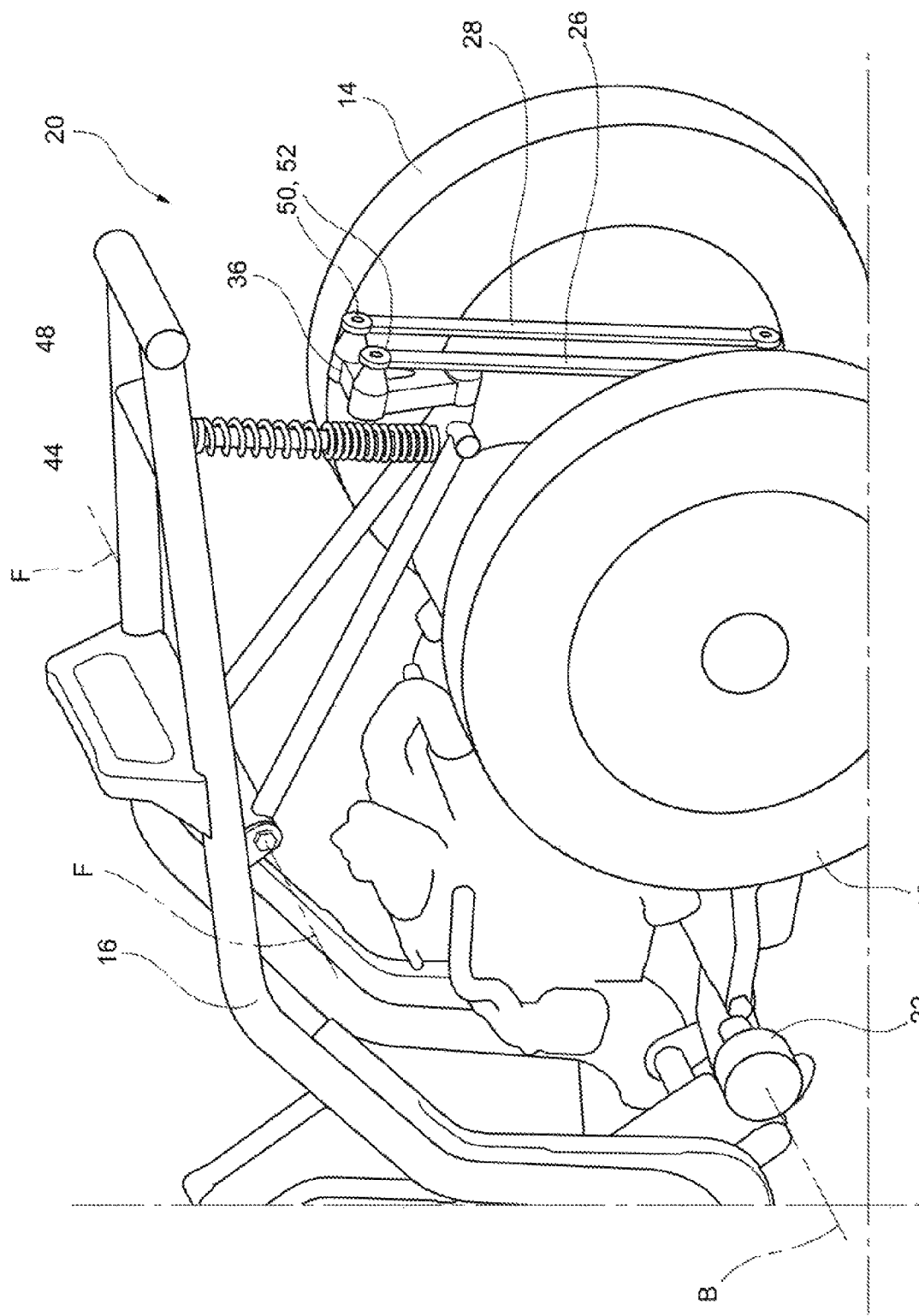
FIG. 10 represents a perspective view of a further embodiment of the present disclosure.

In this regard, the difference in size between the solution in FIGS. 6-7 and the solution in FIGS. 8 and 10 is shown in FIG. 9.

According to a first embodiment (FIGS. 5a, 8), the distal ends 40, 42 of the first crosspiece 36 are hinged to upper ends 50, 52 of the uprights 26, 28, and the center C of first crosspiece 36 is directly hinged to the frame 16. Each of the uprights 26, 28 comprises a suspension 48 to dampen the rear end 20 with respect to the frame 16. This embodiment classically comprises the use of two equal suspensions, one at each upright 26, 28. It is also possible to arrange a spring at one of said uprights 26, 28 and a damper at the other upright 28, 26. This solution offers the advantage of considerably containing the overall size in a transverse direction, i.e. perpendicular to the rolling axis R-R. The containment of the size is schematized in FIG. 9, in which, with the same rolling angle, the transverse size of a quadrilateral provided with only one first crosspiece 32 and two uprights (each provided with suspensions 48) is compared to a quadrilateral having a couple of crosspieces 32, 56, which is described better below.

The advantage in terms of size lies in the fact that the two suspensions tilt by the same angle, but remain displaced towards the center or center line: in the case of a narrow lane, this can be decisive in terms of size.

In particular, in a second embodiment (FIGS. 5b, 6, 7), the motor cycle 4 comprises a second crosspiece 56, besides the first crosspiece 36. Each of the uprights 26, 28 is hinged to the engine group 24 in a first lower end 60, 62.

The uprights 26, 28 are hinged to the first crosspiece 36 in an opposite upper end 50, 52 and to the second crosspiece 56 in an intermediate position 64 between the lower 60, 62 and upper ends 50, 52.

In other words, starting from the top, the uprights 26, 28 are hinged to the first crosspiece 36, to the second crosspiece 56 and to the engine group 24 respectively.

In turn, the second crosspiece 56 is hinged centrally to a lower end 68 of the transmission element 44. The transmission element 44 is hinged, in turn, in an intermediate position, to the first crosspiece 36 and at an upper end to the frame 16.

Advantageously, the transmission element 44 further comprises a suspension 48 provided, for example, with a spring and a damper (FIG. 10).

This solution allows the use of a single suspension 48, but it also requires the use of a second crosspiece 56. In terms of transverse size, as seen, this is increased with respect to the solution with two suspensions at the uprights 26, 28. However, this solution allows the exclusion of potential manufacturing flaws of the two suspensions in the first embodiment, which would result in the asymmetric working of the rolling system.

According to a third embodiment (FIGS. 5c, 10), the transmission element 44 is hinged to the frame 16 to allow an oscillation of the transmission element about a transverse axis F-F parallel to the pitching axis B-B of the motor cycle 4.

Furthermore, the distal ends 40, 42 of the first crosspiece 36 are hinged to upper ends 50, 52 of said uprights 26, 28, and the center C of the first crosspiece 36 is hinged to the transmission element 44. In turn, the transmission element comprises a suspension 48 connected to the frame.

This solution allows the overall size of the suspension to be limited further: in particular, in the part comprised between the wheels, it is possible to replace the two suspensions with two struts and thus place a single suspension 48 at the top, which can consequently work under compression. In this case, too, the solution allows the exclusion of potential manufacturing flaws of the two suspensions in the first embodiment, which would result in the asymmetric working of the rolling system.

According to one embodiment, the rotation axes of the lower hinges 32 of the first crosspiece 36 and the hinges of the uprights 26, 28 are parallel to the rolling axis R-R.

This condition facilitates the rolling movement of the frame and allows slighter misalignments between the movable elements and consequently reduced friction during the compressions of the suspensions and the rotations of the uprights 26, 28.

As can be appreciated from the description, the present disclosure allows the drawbacks of the prior art to be overcome.

In particular, the present disclosure defines a neutral rolling suspension, wherein the simple geometric variation in the rolling angle does not require a variation in the length of the suspension.

In this way, the stability of the vehicle is improved significantly with respect to the solutions of the prior art since the rear part of the vehicle tends not to lower, thus increasing the incidence and consequently the front wheel trail of the front end of the motor cycle.

At the same time, the size of the suspension of the present disclosure is contained and therefore allows the rear end to bear caissons, also with considerable dimensions.

A person skilled in the art can make various modifications and changes to the motor cycles described above to satisfy specific and contingent needs, all of which are contained in the scope of the disclosure as defined by the following claims.

The invention claimed is:

1. Tilting motorcycle with at least three wheels comprising:
    a frame,
    at least one front wheel,
    a rear end comprising an engine group and a pair of rear wheels,
    wherein said rear end is hinged to the frame so as to allow a rolling of the frame around a rolling axis and a pitching of the rear end around a pitching axis,
    wherein said rear end is further connected to the frame by means of a suspension system comprising:
        a pair of uprights connected at their bottoms by two first hinges to the engine group,
        at least a first crosspiece hinged at its distal ends to the uprights,
        the centre of said first crosspiece being connected to the frame directly or indirectly by a transmission element,
    wherein said uprights or transmission element comprise a suspension to dampen the rear end with respect to the frame; and
    wherein the pair of rear wheels are disposed on a rigid axle.

2. Tilting motorcycle with at least three wheels according to claim 1, wherein the uprights are arranged between opposite sides and the first crosspiece extends between said pair of opposing uprights.

3. Tilting motorcycle with at least three wheels according to claim 1, wherein said centre and said distal ends of the first crosspiece are arranged in a triangle so that the apex of the triangle coincides with the centre of the first crosspiece and is situated at a predetermined distance from the baseline joining said distal ends.

4. Tilting motorcycle with at least three wheels according to claim 3, wherein a distance between said rolling axis and a line which joins said first two hinges coincides substantially with said predetermined distance.

5. Tilting motorcycle with at least three wheels according to claim 1, wherein said first hinges, said uprights, the centre and the distal ends of said first crosspiece lie on a common suspension plane.

6. Tilting motorcycle with at least three wheels according to claim 5, wherein said suspension plane is perpendicular to said rolling axis.

7. Tilting motorcycle with at least three wheels according to claim 1, wherein the distal ends of the first crosspiece are hinged to upper ends of said uprights and the centre of the first crosspiece results directly hinged to the frame, each of said uprights comprising a suspension to dampen the rear end with respect to the frame.

8. Tilting motorcycle with at least three wheels according to claim 1, wherein the motorcycle comprises a second crosspiece in addition to said first crosspiece, each of said uprights being hinged to the engine group at a first lower end, to said first crosspiece at an opposite upper end and to said second crosspiece in an intermediate position between said lower and upper end.

9. Tilting motorcycle with at least three wheels according to claim 8, wherein the second crosspiece is centrally hinged to a lower end of said transmission element, in turn hinged in an intermediate position to the first crosspiece and at an upper end to the frame said transmission element comprising a suspension.

10. Tilting motorcycle with at least three wheels according to claim 1, wherein said transmission element is hinged to the frame so as to allow an oscillation of the transmission element about an axis parallel to the pitching axis of the motorcycle,
    said distal ends of said first crosspiece are hinged to upper ends of said uprights and the centre of the first crosspiece is hinged to the transmission element,
    the transmission element comprising a suspension connected to said transmission element.

11. Tilting motorcycle with at least three wheels according to claim 1, wherein the rotation axes of the hinges of said first crosspiece and of the hinges of the uprights are parallel to the rolling axis.

12. Tilting motorcycle with at least three wheels according to claim 1, wherein said suspension comprises at least a spring and a damper yielding along a longitudinal axis of the suspension.

13. Tilting motorcycle with at least three wheels according to claim 1, comprising an articulated joint placed between the frame and the rear end to achieve said rolling and pitching of the frame.

14. Tilting motorcycle with at least three wheels according to claim 13, where said articulated joint comprises a Neidhart joint.

* * * * *